United States Patent [19]
Dion et al.

[11] 3,714,701
[45] Feb. 6, 1973

[54] MANUFACTURE OF CLAD METALS

[75] Inventors: Paul A. Dion; Paul O. Hagarman, both of North Attleboro, Mass.

[73] Assignee: Polymetallurgical, Corp., Attleboro, Mass.

[22] Filed: Jan. 4, 1971

[21] Appl. No.: 103,518

[52] U.S. Cl. .......................... 29/474.1, 29/473.3
[51] Int. Cl. ........................................ B21d 39/04
[58] Field of Search........ 29/474.1, 473.3, 473.9, 475

[56] References Cited

UNITED STATES PATENTS

| | | | |
|---|---|---|---|
| 1,685,269 | 9/1928 | Bundy | 29/474.1 |
| 3,220,106 | 11/1965 | Clark | 29/474.1 X |
| 3,443,305 | 5/1969 | Matsuda et al. | 29/474.1 |
| 3,444,610 | 5/1969 | Thompson | 29/474.1 X |
| 3,455,016 | 7/1969 | Dion et al. | 29/474.1 |
| 3,600,790 | 8/1971 | Dion et al. | 29/474.1 |

*Primary Examiner*—J. Spencer Overholser
*Assistant Examiner*—Richard Bernard Lazarus
*Attorney*—Chittick, Pfund, Birch, Samuels & Gauthier

[57] ABSTRACT

A continuous process for cladding a metal core rod with a dissimilar metal sheath. Two thin, flat strips are pre-bent into facing semi-circular shapes and then are moved into convergence around a round core rod while the strips and rod are maintained contaminant free. The strips and rod are maintained at a substantially equal temperature and the assembly is solid-phase roll bonded to produce a clad rod suitable for subsequent drawing into wire without the need for subsequent sintering, metal removal or other finishing operations on the clad rod.

13 Claims, 10 Drawing Figures

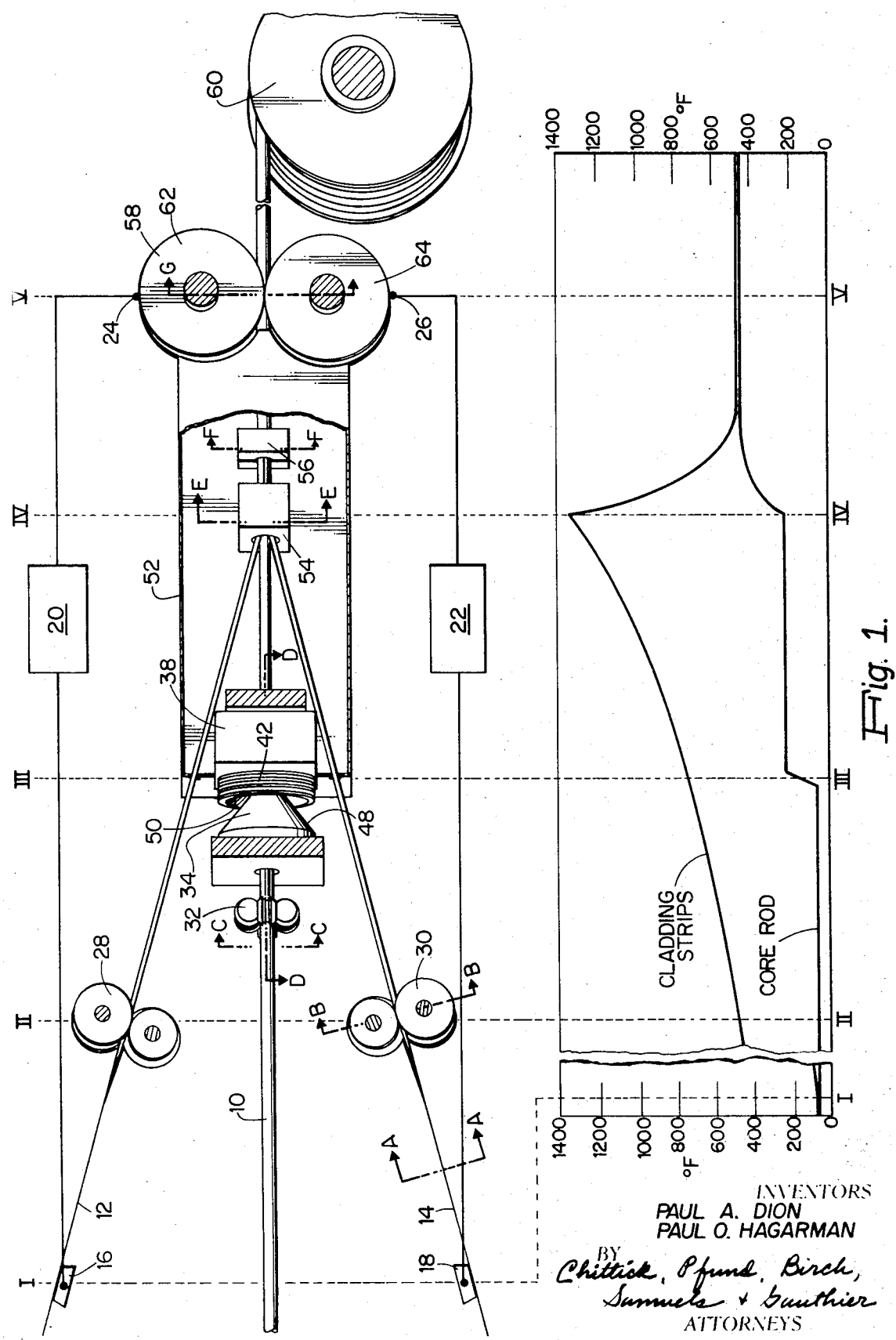

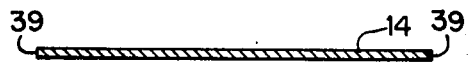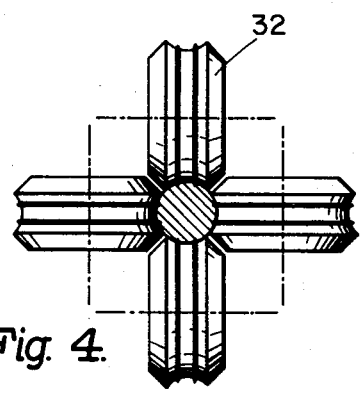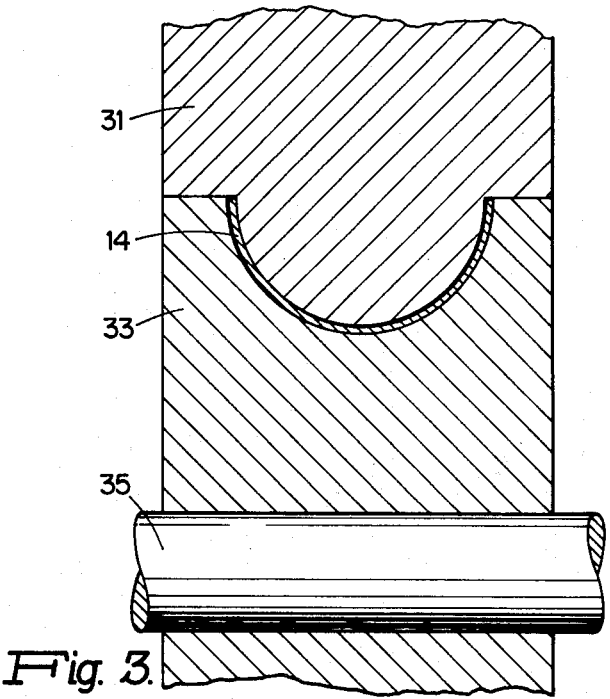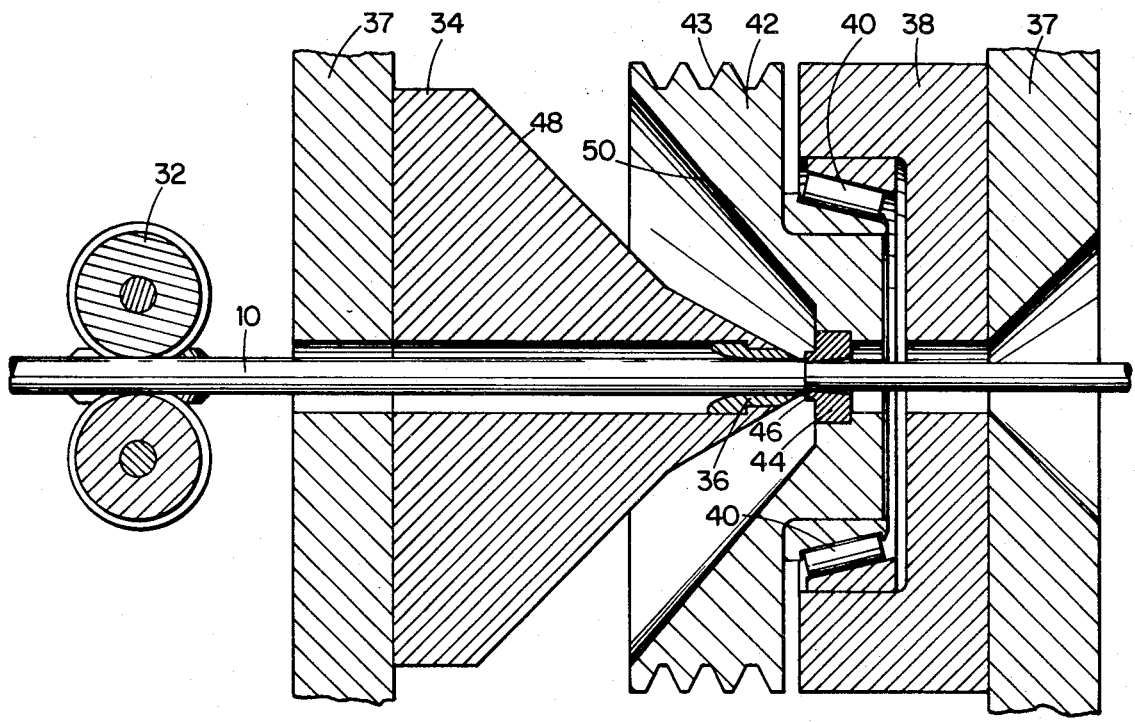

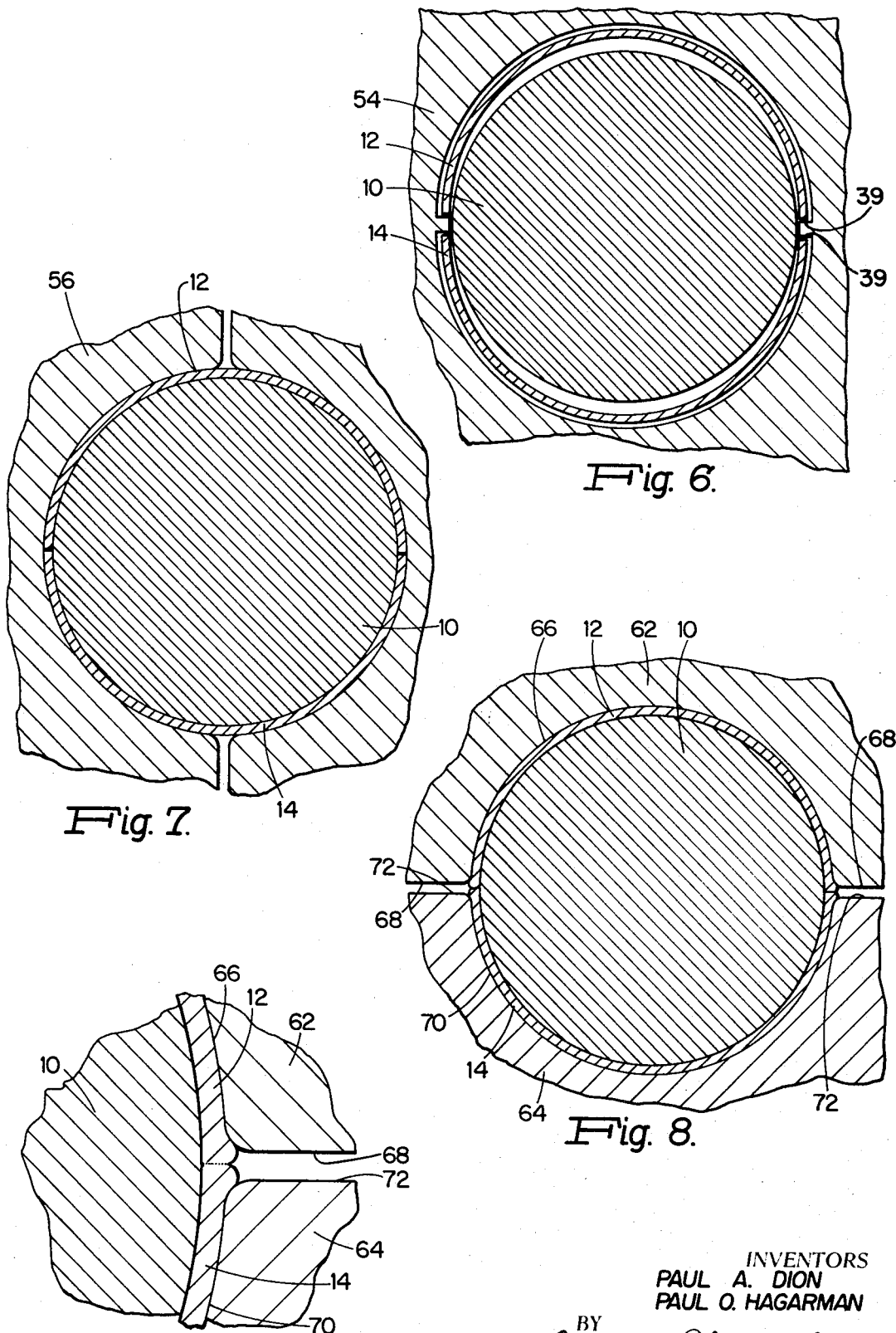

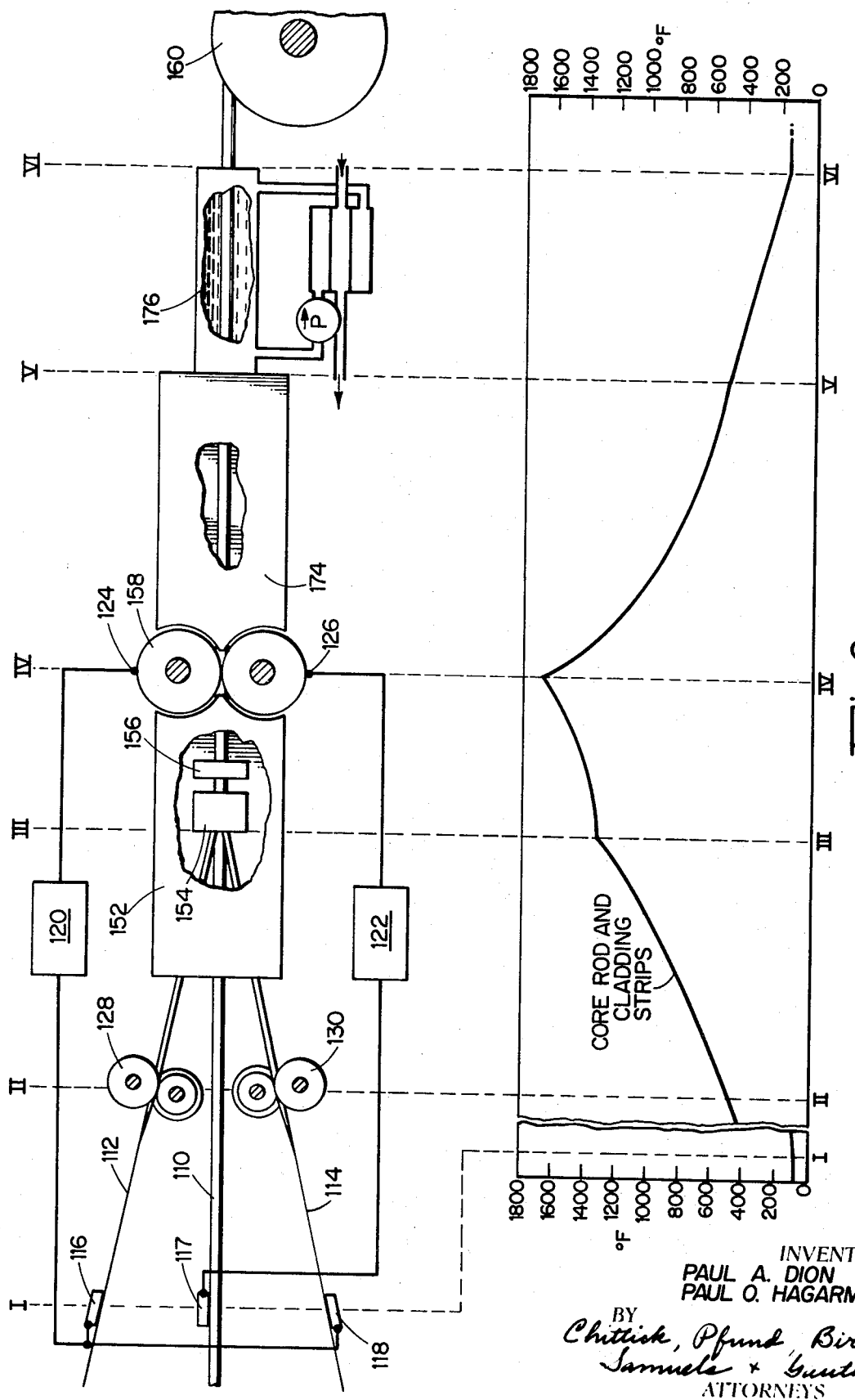

MANUFACTURE OF CLAD METALS

BRIEF SUMMARY OF THE INVENTION

This invention is a process for producing a clad rod having a round metal core and a dissimilar thin metal cladding. The two preferred embodiments are copper clad aluminum and copper clad steel. However, many other metals can be satisfactorily substituted for both the cladding strips and the core rod.

The preferred copper clad aluminum line employs pay-off reels issuing a continuous length of round aluminum core rod and two continuous lengths of flat, thin copper cladding strips above and below the core rod. The copper cladding strips are electrically heated to burn off contaminants and are pre-bent by rolls into semi-circular shapes with facing concave surfaces. The aluminum core rod is optionally longitudinally scored by a peripheral gang assembly of scoring rolls and the oily rod surface is cut away by a rotating hollow mill to expose virgin rod surface.

The cleaned strips and core are moved through an enclosed retort containing an oxide reducing atmosphere where they are fed through a short series of guide boxes which cause the pre-bent strips to converge around the core rod. While in the retort, the cladding strips and the core rod are brought to substantially equal temperatures. The rod and strips are then moved into the nip of a pair of powered bonding rolls where solid-phase bonding occurs. The clad rod is then coiled, ready to be drawn into wire.

The preferred copper clad steel line employs pay-off reels issuing a continuous length of round steel core rod and two continuous lengths of flat, thin copper cladding strips above and below the core rod. The copper cladding strips and the steel core rod are all electrically heated to burn off contaminants and the copper strips are pre-bent by rolls into semi-circular shapes with facing concave surfaces.

The cleaned strips and core are moved through an enclosed retort containing an oxide reducing atmosphere where they are fed through a short series of guide boxes which cause the pre-bent strips to converge around the core rod. While in the retort, the cladding strips and the core rod are maintained at substantially equal temperatures. They then leave the retort and immediately enter the nip of a pair of powered bonding rolls where solid-phase bonding occurs. The clad rod is then cooled and coiled ready to be drawn into wire.

BRIEF DESCRIPTION OF THE DRAWINGS

FIG. 1 is a schematic diagram of the copper clad aluminum line with its associated temperature analysis diagram;

FIG. 2 is a view in section of a copper cladding strip taken on line A—A of FIG. 1;

FIG. 3 is a view in section of the preforming rolls taken on line B—B of FIG. 1;

FIG. 4 is a view in section upstream of the scoring rolls taken on line C—C of FIG. 1;

FIG. 5 is a view in section of the scoring rolls and the hollow mill taken on line D—D of FIG. 1;

FIG. 6 is a view in section of the Number 1 guide box taken on line E—E of FIG. 1;

FIG. 7 is a view in section of the Number 2 guide box taken on line F—F of FIG. 1;

FIG. 8 is a view in section of the bonding rolls taken on line G—G of FIG. 1;

FIG. 8A is an enlarged detail of the cladding strip bonded protuberance shown in FIG. 8; and FIG. 9 is a schematic diagram of the copper clad steel line with its associated temperature analysis diagram.

DETAILED DESCRIPTION OF THE PREFERRED EMBODIMENTS

FIG. 1 shows the schematic flow diagram of the copper clad aluminum line. This is the first preferred embodiment. Aluminum core rod 10 issues from a pay-off coil at approximately 100 ft/min. The core rod 10 is pre-sized at, for example, 0.610 inches diameter.

Simultaneously, copper cladding strips 12 and 14 issue from pay-off coils at approximately the same speed as the core rod 10. The cladding strips 12 and 14 are pre-sized at, for example, 0.016 inches thick by 0.934 inches wide and lower cladding strip 14 is shown in FIG. 2. Cladding strips 12 and 14 are thin and flat and should have a width to thickness ratio which is greater than ten to one.

The cladding strips 12 and 14 are electrically heated by passing a current through them. The copper strips have a resistance substantially higher than the rest of the circuit which causes them to become quite hot. The circuits include (in addition to the cladding strips) electrical contacts 16 and 18, power supplies 20 and 22 and bonding roll contacts 24 and 26 which are grounded.

The moving copper strips are resistance heated from room temperature to about 500°F. prior to their entry into the pre-bending roll stands. This can be graphically seen on the temperature analysis diagram associated with FIG. 1. As the copper strip temperature is increased, the copper surface contaminants, primarily oily residues, become vaporized. It will be understood that the cladding strips can be decontaminated by means other than heat treating. Other means include, by way of example only and not by way of limitation, mechanical abrasion and chemical treatment. Experience has proved that the shown heat treating has produced the best results for the preferred embodiment of FIG. 1.

The copper cladding strips then enter upper and lower pre-bending stands 28 and 30. A cross-sectional view of lower roll stand 30 is shown in FIG. 3. The stand includes a convex roll 31 and a concave roll 33 turning on axle 35. The convex roll axle is not shown in this view. It will be appreciated that the pre-bending operation alternatively can be accomplished by a separate, earlier operation; by using a shaped bending die; or by using core rod 10 as a mandrel. Furthermore, the edges 39 of the cladding strips optionally can be skived and/or machined to better ensure a good copper to copper low temperature bond at a subsequent step in the process. The temperature of the strips has reached approximately 500°F. as they pass through the pre-bending roll stands 28 and 30. The pre-bending rolls bend the copper cladding strips into virtual semi-circular shapes as shown in FIG. 3. The upper pre-bending roll stand 28 bends the upper cladding strip 12 so that its concave surface opens downwardly toward core rod 10. The lower pre-bending roll stand 30 bends the lower cladding strip 14 so that its concave surface opens upwardly toward core rod 10. As the cladding strips are pre-bent and continuing thereafter, the temperature of the strips continues to rise thereby entirely vaporizing all remaining contaminants as well as any contaminants imparted by the pre-bending rolls.

As can be seen in FIG. 1, the aluminum core rod 10 has meanwhile been moving down the line at room temperature. The first operation undergone by core rod 10 is entirely optional. A gang assembly of scoring rolls 32 is shown in FIG. 4 and in cross-section in FIG. 5. This assembly 32 rolls longitudinal score lines into the surface of the core rod 10 for the purpose of ensuring a uniform short chip length at the subsequent hollow milling operation. Short chips are easy to clear and don't become tangled in the machinery. The score lines can be longitudinal, spiral or any other conventional configuration. The four scoring rolls shown in FIG. 4 impart eight longitudinal score lines in the surface of the core rod.

After receiving the optional scoring treatment, the aluminum core rod 10 has its oily surface removed by a hollow milling cutter which is shown in more detail in FIG. 5. First, core rod 10 passes through the cylindrical recesses formed in both machine frame 37 and bushing support 34 which is fixed to the machine frame. Then, the core rod is centered and supported by guide bushing 36 which is mounted on bushing support 34. A hollow mill support 38 is fixed to machine frame 37 and is located downstream of fixed bushing support 34. Hollow mill support 38 carries thrust bearings 40 and a rotatable hollow mill 42 which is adapted to be rotatably driven by an unshown power drive and a belt which frictionally engages grooves 43 on hollow mill 42. A rotating cutter head 44 has teeth 46 which cut away the contaminated surface of core rod 10. As an example, the original 0.610 inch aluminum rod diameter can be milled to a 0.578 inch rod diameter. This cutting action imparts frictional heat to the core rod to bring it up from room temperature to approximately 250°F. At this same point in the processing line, the electrical heating of the copper cladding strips 12 and 14 has raised their temperatures to approximately 700°F.

It will be understood from FIG. 5 that the aluminum chips generated by the cutting action of cutter head 44 are thrown out of the annular chip discharge chute formed by the downstream surface 48 of fixed bushing support 34 and the upstream surface 50 of rotating hollow mill 42. These aluminum chips are substantially uniform in length because of the previous scoring operation which reduces the chips' proclivity to twist and tangle in the discharge chute or in the adjacent moving machinery.

The milling operation is important in order to obtain a good copper to aluminum bond. However, it will be appreciated that what is important is that a virgin aluminum surface is produced and not necessarily the means by which it is accomplished. The milling operation is highly preferred because it is fast, efficient, compact and produces a very smooth clean surface. Other alternative means could include by way of example, chemical treatment, mechanical abrasion or die skiving. The preferred embodiment utilizes a rotating milling cutter which does not re-expose the freshly cut aluminum surface to the oily atmosphere, but rather confines the virgin rod surface to the interior of cutter head 44 until the rod passes into the retort which will be subsequently described.

One of the major problems in bonding copper to copper or copper to aluminum is to provide extremely clean contact surfaces. It is not sufficient to clean the contact surfaces, as by electrical heating or mechanical cutting, because the surfaces immediately oxidize where they are exposed to the oxygen-containing surrounding atmosphere. Therefore, the pre-bent copper cladding strips 12 and 14, when heated to approximately 700°F. enter an enclosed retort 52 which contains an oxide reducing atmosphere having a positive pressure to prevent the entry of air into the retort. Simultaneously, the aluminum core rod 10 enters the retort after passing through rotating cutter head 44 without being exposed to the air. At this point, the core rod has a temperature of approximately 250°F.

The copper strips and the aluminum core pass through the interior of retort 52 on converging paths until they are brought together in Number 1 guide box 54 (preferably made of carbide) which is shown in cross-section in FIG. 6. The strips and core are then led through a similar Number 2 guide box 56 which is shown in cross-section in FIG. 7. As can be seen from the associated temperature analysis diagram, the continuously heated copper strips reach their maximum temperature of approximately 1,300°F. as they enter the Number 1 guide box. At this point, the aluminum core rod still has a temperature of approximately 250°F.

The primary purposes of the guide boxes 54 and 56 are two-fold. First, the cladding strips are guided around the core rod with their facing edges 39 in abutting relation so that the cladding strips are in position to be subsequently bonded to the core rod and to each other. Second, the temperatures of the cladding strips and the core rod are equalized by virtue of their mutual contact prior to the entry of the strips and the rod into the bonding roll stand. As shown by the temperature analysis diagram, the strips and core equalize their temperatures about mid-way between the Number 1 guide box and the bonding rolls. This equalized temperature, in the preferred embodiment, is approximately 500°F.

After leaving the Number 2 guide box in the contacting position shown in FIG. 7, the cladding strips and core rod exit from retort 52 and immediately, before significant oxidation occurs, enter the nip of the bonding roll stand 58. Under light to moderate pressure, the copper cladding strips are solid-phase bonded to the aluminum core rod and to their own facing edges 39 at a bonding temperature of approximately 500°F. The bonding action produces a 6 to 20 percent reduction of the cross-sectional area of the strip-rod composite between bonding roll entry and exit. After leaving the bonding roll stand 58, the clad rod moves to a take up coil 60 where it is temporarily stored prior to wire drawing or other use.

The bonding roll stand 58 employs an upper roll 62 and a lower roll 64. As shown in FIGS. 8 and 8A, upper roll 62 has a concave groove 66 and flat lands 68 flanking the groove. The lower roll 64 has an identical mirror image groove 70 and lands 72. The rolls are powered and are set to apply a light to moderate bonding pressure as shown in FIG. 8 wherein the lands are parallel and slightly spaced apart. The heat and pressure produce a solid-phase bond between the concave surfaces of copper cladding strips 12 and 14 and the entire periphery of aluminum core rod 10. Also, the facing edges of the copper strips are bonded together which action produces a very small protuberance shown in great detail in FIG. 8A. This protuberance is so small that it in no way requires subsequent skiving or any scrap removal at all prior to wire drawing or at any other time.

It is also very important to note that this process requires no sintering or other heat treatment prior to wire drawing or at any other time. The fact that neither skiving nor sintering is required is a considerable economic advantage over many of the processes in current use.

FIG. 9 shows the schematic flow diagram of the copper clad steel line. This is the second preferred embodiment. Steel core rod 110 issues from a pay-off coil at approximately 30 ft/min. The core rod is pre-sized at, for example, 0.300 inches diameter.

Simultaneously, copper cladding strips 112 and 114 issue from pay-off coils at approximately the same speed as the core rod 110. The cladding strips 112 and 114 are pre-sized at, for example, 0.020 inches thick by .503 inches wide. The shape is as shown in FIG. 2. Cladding strips 112 and 114 are thin and flat and should have a width to thickness ratio which is greater than ten to one.

The cladding strips are electrically heated by passing a current through them. As in the copper clad aluminum embodiment of FIG. 1, the copper steel line of FIG. 9 utilizes the copper strips, a single power supply 120, electrical contacts 116 and 118 and bonding roll contact 124. A separate steel core heating circuit utilizes the steel rod, power supply 122, electrical contact 117 and bonding roll contact 126.

The moving strips are resistance heated from room temperature to about 500°F. prior to their entry into the pre-bending roll stands. This can be graphically seen on the temperature analysis diagram associated with FIG. 9. As the copper strip temperature is increased, the copper surface contaminants, primarily oily residues, become vaporized.

The copper cladding strips then enter upper and lower preforming stands 128 and 130. The stands each include a convex roll and a concave roll as shown in FIG. 3. The edges of the cladding strips optionally can be skived and/or machined to better insure a good copper to copper bond at a subsequent step in the process.

The pre-bending rolls bend the copper cladding strips into virtual semi-circular shapes as shown in FIG. 3. The upper pre-bending roll stand 128 bends the upper cladding strip 112 so that its concave surface opens downwardly toward steel core rod 110. The lower pre-bending roll stand 130 bends the lower cladding strip 114 so that its concave surface opens upwardly toward steel core rod 110. As the cladding strips are pre-bent, and continuing thereafter, the temperature of the strips continues to rise thereby entirely vaporizing all remaining contaminants as well as any contaminants imparted by the pre-bending rolls.

As can be seen in FIG. 9, the steel core rod 110 has meanwhile continued down the line. The temperature of the steel core rod steadily rises at approximately the same rate as the copper strips to vaporize contaminants. At a temperature of approximately 700°F., the pre-bent copper strips 112 and 114 and the steel core rod 110 enter an enclosed retort 152 which contains an oxide reducing atmosphere having a positive pressure to prevent the entry of air into the retort.

The copper strips and the steel core rod pass through the interior of retort 152 on converging paths until they are brought together first in Number 1 guide box 154 and then in Number 2 guide box 156. As can be seen from the associated temperature analysis diagram, the continuously heated strips and core rod reach a temperature of approximately 1,300°F. as they enter the Number 1 guide box.

The purposes of the guide boxes are two-fold. First, the cladding strips are guided around the core rod with their facing edges in abutting relation so that the cladding strips are in position to be subsequently bonded to the core rod and to each other. Second, the temperatures of the cladding strips and core rod are equalized by virtue of their mutual contact prior to the entry of the strips and rod into the bonding roll stand. As shown by the temperature analysis diagram, the strips and core rod more closely equalize their previously similar temperatures soon after leaving the Number 1 guide box and their temperatures remain equalized throughout their remaining travel in the retort.

After leaving the Number 2 guide box in the contacting position shown in FIG. 7, the cladding strips and core rod exit from retort 152 and immediately, before significant oxidation occurs, enter the nip of the bonding roll stand 158. There, the copper cladding strips are solid-phase bonded to the steel core rod and to their own facing edges at a bonding temperature of approximately 1,600°F. This bonding temperature is substantially higher than the bonding temperature employed in the first embodiment copper clad aluminum process. The bonding action produces a 6 to 20 percent reduction of the cross-sectional area of the strip-rod composite between bonding roll entry and exit.

The bonding roll stand 158 comprises bonding rolls 162 and 164 which have virtually identical lands 168, 172 and grooves 166, 170, respectively, as does the copper clad aluminum embodiment shown in FIG. 8 and the identical small copper edge protuberance is produced as that shown in FIG. 8A. As there, the protuberance is so small that it in no way requires subsequent skiving or any scrap removal at all prior to wire drawing or at any other time. Also, no sintering or other heat treatment is required subsequent to bonding.

After leaving the bonding rolls at approximately 1,500°F., the clad rod is still too hot to expose to the atmosphere without undesirable oxidation occurring. Therefore, a second retort 174 is entered immediately after bonding. The retort contains an oxide reducing atmosphere having a positive pressure to prevent the entry of air into the retort. The retort has a relatively long length and permits the clad rod to cool to approximately 500°F. or less without oxidizing. The downstream end of retort 174 is sealed to a water cooling unit 176 which includes a water tank, a water circulating pump and means for cooling the water.

The clad rod passes through the water bath, emerges from the water cooling unit 176 and moves to a take up coil 160 where it is temporarily stored prior to wire drawing or other use.

It will be appreciated that other metals can be substituted for the cladding strips and core rod. Examples include, but are not limited to, copper clad steel (having any one of various carbon grades); copper clad nickel-iron alloy; silver clad nickel, silver clad copper, nickel clad steel; and monel clad steel.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

We claim:

1. A process for cladding a moving metal core rod with a dissimilar metal sheath, said process comprising the following steps:
   a. pre-bending a pair of continuous lengths of thin flat metal cladding strips into semi-circular shapes, said thin flat strips having a cross-sectional area width to thickness ratio of greater than 10 to one;
   b. removing contaminants from the concave surfaces of said cladding strips and from the entire periphery of a continuous length of round metal core rod;
   c. enclosing said core rod with said pre-bent cladding strips with the thin facing edges of said strips abutting while said core periphery and said strip concave surfaces are maintained contaminant-free, said thin flat strips forming a circular sheath around said core rod, said strips having a total cross-sectional area equalling less than approximately 40 percent of the total cross-sectional area of the sum of said strips and said core rod;
   d. maintaining said cladding strips and said core rod at approximately equal temperatures; and,
   e. solid-phase bonding said sheath to said core rod to produce a clad rod which is substantially free of strip edge fins protruding from the clad rod periphery that require removal, said strip edge fins having a total cross-sectional area equalling less than approximately 2.5 percent of the total cross-sectional area of the sum of said cladding strips and said core rod, said clad rod being immediately suitable for drawing into wire without subsequent heat treatment.

2. The process of claim 1 wherein contaminants are removed from the edges of said pre-bent cladding strips.

3. The process of claim 1 wherein the contaminants are removed from said cladding strips and said core rod by the application of electrically generated heat.

4. The process of claim 1 wherein the contaminants are removed from said cladding strips by the application of electrically generated heat and the contaminants are removed from said core rod by the mechanical action of a rotating cutting head.

5. The process of claim 1 wherein after cladding strip pre-bending and after cladding strip and core rod contaminant removal, the facing surfaces of said core rod and said cladding strips are maintained contaminant-free until and during the solid-phase bonding step.

6. The process of claim 5 wherein said core rod and said cladding strips are maintained contaminant-free within a retort containing a reducing atmosphere.

7. The process of claim 1 wherein the combined widths of said pre-bent cladding strips is substantially identical to the circumference of said rod and the solid-phase bonding produces a protuberance at the bonded contacting facing edges of said strips which is so small as to render unnecessary any subsequent scrap removal or skiving of the protuberance prior to wire drawing.

8. The process of claim 4 wherein, after contaminant removal, said pre-bent cladding strips and said core rod are moved into convergence through at least one guide box within a retort containing a reducing atmosphere prior to solid-phase bonding.

9. The process of claim 1 wherein said solid-phase bonding is produced by a pair of powered rolls having semi-circular facing grooves and slightly spaced-apart parallel lands.

10. The process of claim 1 wherein said cladding strips and said core rod are maintained at approximately equal temperatures prior to their entry into the solid-phase bonding rolls.

11. The process of claim 1 wherein, after solid-phase bonding, the clad rod is moved through a retort containing a reducing atmosphere.

12. The process of claim 11 wherein, after moving through said retort, the clad rod is moved through a water cooling unit.

13. A process for cladding a moving metal core rod with a dissimilar metal sheath, said process comprising the following steps:
   a. removing contaminants from the concave surfaces of a pair of continuous lengths of thin flat metal cladding strips and from the entire periphery of a continuous length of round metal core rod, said strips having a width to thickness ratio of greater than ten to one;
   b. pre-bending said pair of cladding strips into semicircular shapes;
   c. enclosing said core rod with said pre-bent cladding strips with the thin facing edges of said strips abutting while said core periphery and said strip concave surfaces are maintained contaminant-free, said thin flat strips forming a circular sheath around said core rod, said strips having a total cross-sectional area equalling less than approximately 40 percent of the total cross-sectional area of the sum of said strips and said core rod;
   d. maintaining said cladding strips and said core rod at approximately equal temperatures; and,
   e. solid-phase bonding said sheath to said core rod to produce a clad rod which is substantially free of strip edge fins protruding from the clad rod periphery that require removal, said strip edge fins having a total cross-sectional area equalling less than approximately 2.5 percent of the total cross-sectional area of the sum of said cladding strips and said core rod, said clad rod being immediately suitable for drawing into wire without subsequent heat treatment.

* * * * *